United States Patent
Hoshi et al.

(10) Patent No.: US 9,143,064 B2
(45) Date of Patent: Sep. 22, 2015

(54) CONTROL APPARATUS FOR ELECTRIC POWER STEERING APPARATUS

(75) Inventors: Yuzuru Hoshi, Gunma (JP); Fumitoshi Nakamura, Gunma (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 13/322,692

(22) PCT Filed: Oct. 11, 2011

(86) PCT No.: PCT/JP2011/073303
§ 371 (c)(1),
(2), (4) Date: Dec. 30, 2011

(87) PCT Pub. No.: WO2012/108079
PCT Pub. Date: Aug. 16, 2012

(65) Prior Publication Data
US 2013/0314015 A1    Nov. 28, 2013

(30) Foreign Application Priority Data
Feb. 7, 2011    (JP) .................................. 2011-023986

(51) Int. Cl.
*H02P 6/10* (2006.01)
*H02P 6/14* (2006.01)
(Continued)

(52) U.S. Cl.
CPC *H02P 6/10* (2013.01); *B62D 5/046* (2013.01); *H02P 21/0035* (2013.01); *H02P 21/05* (2013.01); *H02P 29/0038* (2013.01)

(58) Field of Classification Search
USPC .................................... 318/400, 432; 701/41
See application file for complete search history.

(56) References Cited

U.S. PATENT DOCUMENTS 5,500,874 A * 3/1996 Terrell .......................... 375/232
5,986,418 A * 11/1999 Horst et al. ............... 318/400.23
(Continued)

FOREIGN PATENT DOCUMENTS

JP   09-172703 A    6/1997
JP   2005-312178 A   11/2005
(Continued)

OTHER PUBLICATIONS

International Search Report for PCT/JP2011/073303; Nov. 8, 2011.

*Primary Examiner* — Paul Ip
*Assistant Examiner* — Devon Joseph
(74) *Attorney, Agent, or Firm* — Sughrue Mion, PLLC

(57) ABSTRACT

[Problem]
An object of the present invention is to provide a control apparatus for an electric power steering apparatus that improves ripple accuracy of a torque, a velocity and so on, does not generate abnormal noises and does not generate an uncomfortable feeling with respect to a steering by compensating each-phase characteristics of a motor and the control apparatus and converting into a desired characteristic, and at the same time conforming each-phase characteristics.
[Means for Solving the Problem]
The present invention is a control apparatus for an electric power steering apparatus that calculates a steering assist torque command value based on a steering torque generated in a steering shaft and a velocity, calculates each-phase current command values from the steering assist torque command value, and controls a motor that provides a steering mechanism with a steering assist torque based on current control values calculated from the each-phase current command values and each-phase current values of the motor, comprising: arranging filters having a characteristic that compensates each-phase characteristics of the motor and the control apparatus at each pathway, and conforming the each-phase characteristics of the motor and the control apparatus, and at the same time, making the each-phase characteristics of the motor and the control apparatus becoming a desired characteristic.

15 Claims, 10 Drawing Sheets

(51) Int. Cl.
*H02K 29/08* (2006.01)
*H02P 6/08* (2006.01)
*B62D 5/04* (2006.01)
*H02P 29/00* (2006.01)
*H02P 21/00* (2006.01)
*H02P 21/05* (2006.01)

(56) References Cited

U.S. PATENT DOCUMENTS

| | | | | |
|---|---|---|---|---|
| 2006/0017413 | A1* | 1/2006 | Okamoto et al. | 318/432 |
| 2007/0090782 | A1* | 4/2007 | Endo et al. | 318/432 |
| 2007/0107973 | A1* | 5/2007 | Jiang et al. | 180/443 |
| 2007/0198153 | A1* | 8/2007 | Oya et al. | 701/41 |
| 2008/0199160 | A1* | 8/2008 | Yamazaki | 388/815 |
| 2008/0296085 | A1* | 12/2008 | Suzuki | 180/444 |
| 2008/0297077 | A1* | 12/2008 | Kovudhikulrungsri et al. | 318/400.02 |
| 2009/0079371 | A1* | 3/2009 | Suzuki | 318/400.02 |
| 2011/0022271 | A1* | 1/2011 | Ueda et al. | 701/41 |

FOREIGN PATENT DOCUMENTS

JP 2009-081951 A 4/2009
JP 2010-130707 A 6/2010

\* cited by examiner (A) a-PHASE (B) b-PHASE (C) c-PHASE

CONTROL APPARATUS FOR ELECTRIC POWER STEERING APPARATUS

CROSS REFERENCE TO RELATED APPLICATIONS

This application is a National Stage of International Application No. PCT/JP2011/073303 filed Oct. 11, 2011, claiming priority based on Japanese Patent Application No. 2011-023986 filed Feb. 7, 2011, the contents of all of which are incorporated herein by reference in their entirety.

TECHNICAL FIELD

The present invention relates to a control apparatus for an electric power steering apparatus that provides a steering system of a vehicle with a steering assist torque generated by a brushless DC motor, and in particular to a control apparatus for an electric power steering apparatus that improves ripple accuracy of a torque, a velocity and so on, does not generate abnormal noises and does not generate an uncomfortable feeling with respect to steering by converting each-phase characteristics of a motor and the control apparatus into a desired characteristic.

BACKGROUND ART

An electric power steering apparatus that energizes a steering apparatus of a vehicle by using a rotational torque of a motor as an assist torque, applies a driving force of the motor as the assist torque to a steering shaft or a rack shaft by means of a transmission mechanism such as gears or a belt through a reduction mechanism. In order to accurately generate the assist torque (a steering assist torque), a control apparatus for such a conventional electric power steering apparatus performs a feedback control of a motor current. The feedback control adjusts a voltage supplied to the motor so that a difference between a current control value and a detected motor current value becomes small, and the adjustment of the voltage applied to the motor is generally performed by an adjustment of a duty ratio of a PWM (Pulse Width Modulation) control.

Here, a general configuration of an electric power steering apparatus will be described with reference to FIG. 1. As shown in FIG. 1, a column shaft 2 connected to a steering wheel (a handle) 1 is connected to tie rods 6 of steered wheels through reduction gears 3, universal joints 4A and 4B, and a rack and pinion mechanism 5. The column shaft 2 is provided with a torque sensor 10 for detecting the steering torque of the steering wheel 1, and a motor (a brushless DC motor) 20 for assisting the steering force of the steering wheel 1 is connected to the column shaft 2 through the reduction gears 3. Electric power is supplied to a control unit (ECU) 30 for controlling the electric power steering apparatus from a battery 14, and an ignition signal is inputted into the control unit 30 through an ignition key 11. The control unit 30 calculates a steering assist torque command value Tref of an assist command based on a steering torque T detected by the torque sensor 10 and a velocity V detected by a velocity sensor 12, and controls a current I supplied to the motor 20 based on calculated steering assist torque command value Tref. Furthermore, it is also possible to obtain the velocity V from a CAN communication network of the vehicle.

The control unit 30 mainly comprises a CPU, and general functions performed by programs within the CPU (or an MCU or an MPU) are shown in FIG. 2. Furthermore, FIG. 2 shows a case of a vector control system that performs current control by means of a d-axis current command value Id and a q-axis current command value Iq.

In the case of the vector control, a rotation sensor (such as a resolver or a Hall sensor) 21 for detecting a rotational position θ is connected to the motor 20, the rotational position θ from the rotation sensor 21 is inputted into a rotational speed calculating section 22, and a rotational speed ω is calculated. The steering torque T, the velocity V and the rotational speed ω are inputted into a steering assist torque command value calculating section 31, and the steering assist torque command value Tref is calculated. A current command value calculating section 32 calculates the d-axis current command value Id and the q-axis current command value Iq based on the steering assist torque command value Tref, the rotational position θ and the rotational speed ω. The d-axis current command value Id, the q-axis current command value Iq and the rotational position θ are inputted into an each-phase current command value calculating section 33. Each-phase current command values Iaref, Ibref and Icref that are calculated by the each-phase current command value calculating section 33, are inputted into subtracting sections for feedback 34a, 34b and 34c, respectively. Each-phase currents ia, ib and ic of the motor 20 that are detected by current detectors 38a, 38b and 38c, are fed back into the subtracting sections 34a, 34b and 34c. Deviations (Iaref-ia, Ibref-ib and Icref-ic) obtained by the subtracting sections 34a, 34b and 34c, are inputted into a PI control section 35. Voltage command values Varef, Vbref and Vcref that are calculated by the PI control section 35, drive and control the motor 20 via a PWM control section 36 and an inverter 37.

In the above-described electric power steering apparatus, since resistance values of three phases between the brushless DC motor 20 and the control unit 30 (i.e. resistance (R) and inductance (L)) are not identical, and are different respectively, as shown in FIG. 3, there is a problem that maximum amplitude values of currents ia, ib and ic that flow in three phases do not become identical, and torque ripple occurs. That is to say, in the case of FIG. 3, with respect to a peak value of the phase current ib, a gap Pa appears in the phase current ia, and a gap Pc appears in the phase current ic. Furthermore, with respect to variation in each-phase current values of the motor, variation factors of the inverter circuit 37, substrates, wiring resistances and so on within the control unit 30 are conceivable other than variation in characteristic of a stand-alone motor.

From the aspect of improving steering performances, reducing operating noises and vibrations due to such a difference in the peak value of the phase current, is strongly requested.

In order to solve such a problem, for example, in Japanese Patent Application Laid-Open No. 2009-81951 (Patent Document 1), a motor control signal generating section comprises a phase resistance correction calculating section, preliminarily-measured each-phase resistance values Ru, Rv and Rw, and a reference resistance value R are stored in the phase resistance correction calculating section, based on these stored values, correction components εd and εq for canceling out a voltage drop item of a voltage equation that varies depending on a rotational angle of the motor, are calculated, the motor control signal generating section corrects a d-axis voltage command value Vd* and a q-axis voltage command value Vq* that aims to suppress occurrence of the torque ripple due to differences in each-phase resistance values by overlaying these correction components εd and εq on the d-axis voltage command value Vd* and the q-axis voltage command value Vq*.

Furthermore, in Japanese Patent Application Laid-Open No. 2010-130707 (Patent Document 2), a three-phase correction section calculates armature winding resistances Ru, Rv and Rw, or rates of winding resistance Gu, Gv and Gw of three phases based on command currents id* and iq* on the d-axis and the q-axis, and a current value is detected by a current sensor, based on the calculated armature winding resistances Ru, Rv and Rw, or the calculated rates of winding resistance Gu, Gv and Gw, a correction for compensating a deviation from a setup value that is due to variation in winding resistance values of three phases, is performed with respect to each-phase command voltages Vu, Vv and Vw that are obtained by a dq-axes/three-phase converting section, even in the case that each-phase winding resistance values are different due to resistance change caused by variation in manufacturing resistances and an ambient temperature, and so on, a deviation of the command voltage due to that difference is corrected, and the torque ripple is reduced.

THE LIST OF PRIOR ART DOCUMENTS

Patent Documents

Patent Document 1: Japanese Patent Application Laid-Open No. 2009-81951
Patent Document 2: Japanese Patent Application Laid-Open No. 2010-130707

SUMMARY OF THE INVENTION

Problems to be Solved by the Invention

However, both Patent Document 1 and Patent Document 2 aim to conform maximum amplitude values of currents of three phases, there is a problem that it is impossible to arbitrarily adjust each-phase characteristics of the motor and the control apparatus that is decided by manufacturing (each-phase inductances Lx and each-phase resistances Rx) and it is impossible to obtain desired dynamic characteristics (transient response).

The present invention has been developed in view of the above described circumstances, and an object of the present invention is to provide a control apparatus for an electric power steering apparatus that improves the ripple accuracy of the torque, the velocity and so on, does not generate abnormal noises and does not generate the uncomfortable feeling with respect to the steering by compensating each-phase characteristics of the motor and the control apparatus and converting into the desired characteristic, and at the same time conforming each-phase characteristics.

Means for Solving the Problems

The present invention relates to a control apparatus for an electric power steering apparatus that calculates a steering assist torque command value based on a steering torque generated in a steering shaft and a velocity, calculates each-phase current command values from said steering assist torque command value, and controls a motor that provides a steering mechanism with a steering assist torque based on current control values calculated from said each-phase current command values and each-phase current values of said motor, the above-described object of the present invention is achieved by that comprising: arranging filters having a characteristic that compensates each-phase characteristics of said motor and said control apparatus at each pathway, and conforming said each-phase characteristics of said motor and said control apparatus, and at the same time, making said each-phase characteristics of said motor and said control apparatus becoming a desired characteristic.

Further, the above-described object of the present invention is more effectively achieved by that wherein by conforming said desired characteristic to any one of said each-phase characteristics, omitting one filter from said arranged filters; or wherein any two of said each-phase characteristics conform, and said filter is arranged only at remaining phase; or wherein control of said motor is a vector control method, a rotation sensor is connected to said motor, and said steering assist torque command value and said each-phase current command values are calculated based on a rotational angle from said rotation sensor and a rotational speed calculated from said rotational angle; or wherein said motor is a three-phase brushless DC motor.

Effects of the Invention

In the present invention, since each pathway of a voltage command section or a current control section is provided with a filter that compensates each-phase characteristics (Lx, Rx) of the motor and the control apparatus and becomes the desired characteristic (Lh, Rh), it is possible to convert each-phase characteristics of the motor and the control apparatus into the desired characteristic (Lh, Rh), and at the same time conform each-phase characteristics. As a result, it is possible to provide a high-performance control apparatus for an electric power steering apparatus that can improve the ripple accuracy of the torque, the velocity and so on, does not generate the abnormal noises and does not generate the uncomfortable feeling with respect to the steering.

Furthermore, since it is possible to convert each-phase characteristics of the motor and the control apparatus into the desired characteristic (Lh, Rh), it is possible to arbitrarily change the transient response characteristics (the dynamic characteristics).

BRIEF DESCRIPTION OF THE DRAWINGS

In the accompanying drawings.

MODE FOR CARRYING OUT THE INVENTION

Figure 1:
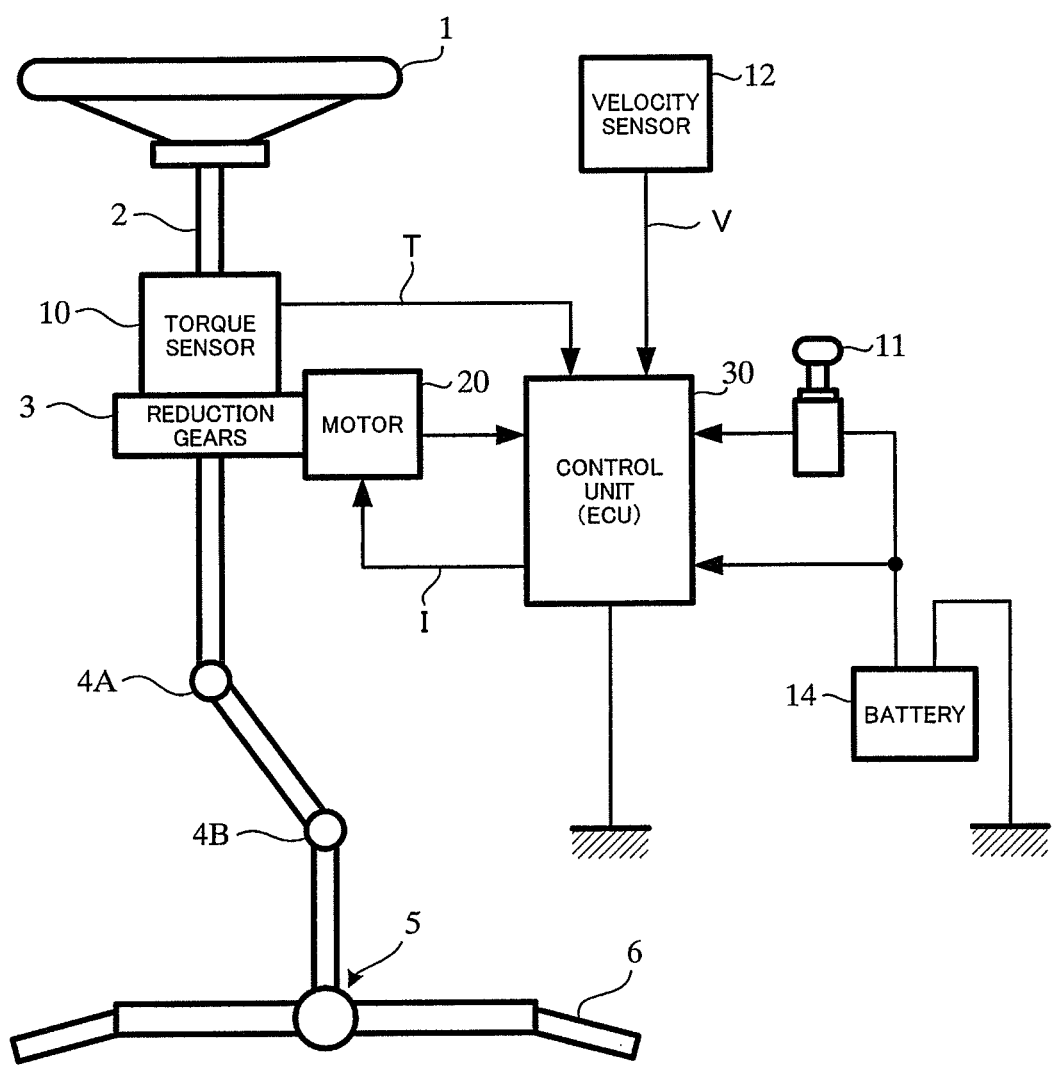
FIG. 1 is a configuration diagram illustrating an example of an electric power steering apparatus.
Figure 2:
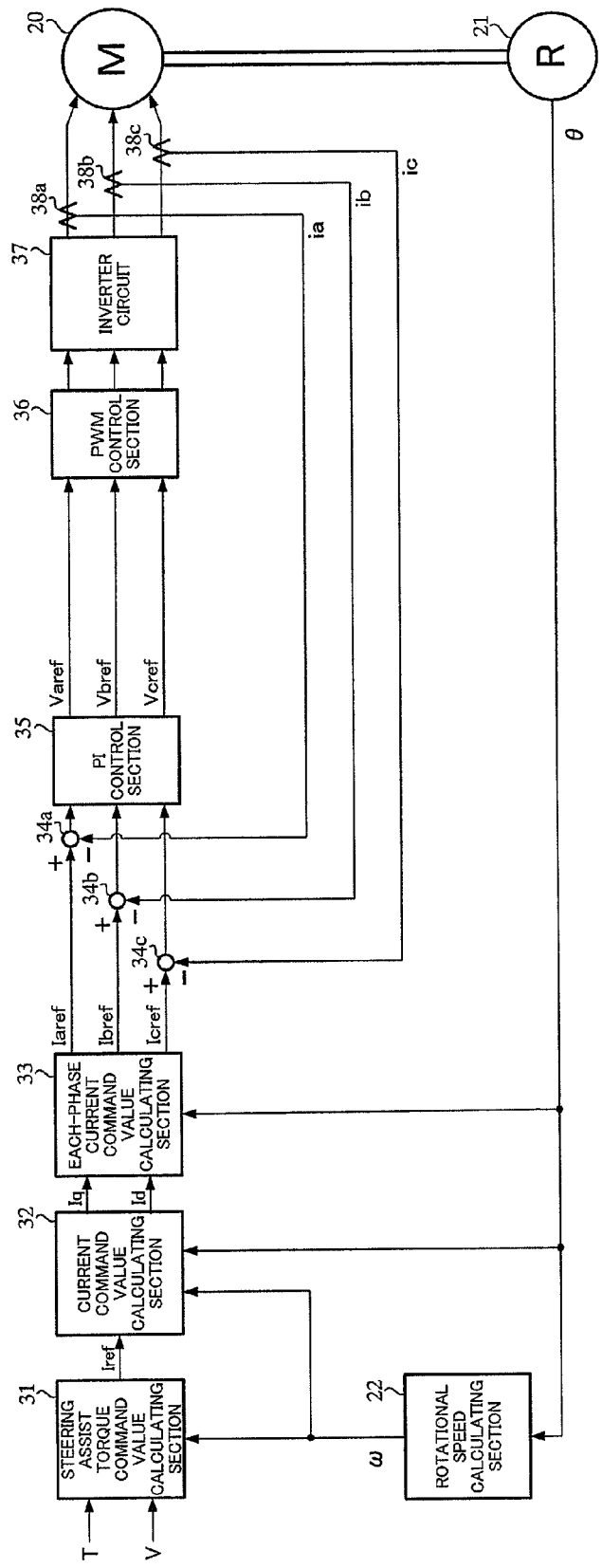
FIG. 2 is a block diagram showing an example of internal configuration of a control unit.
Figure 3:
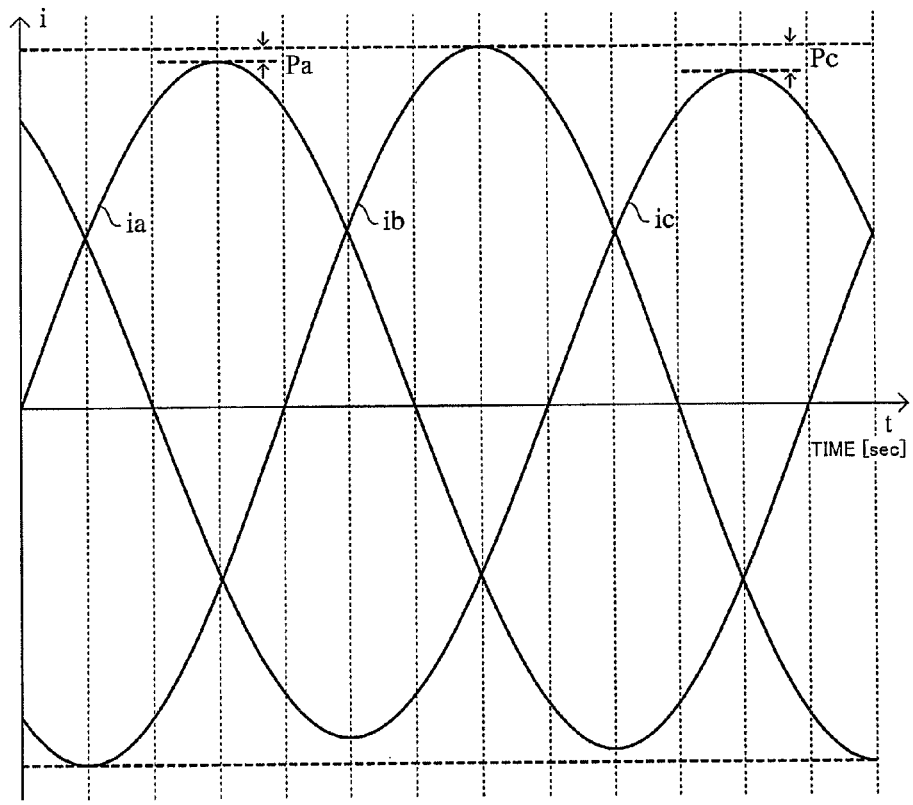
FIG. 3 is a waveform diagram showing an example of variation in each-phase currents (ia, ib, ic) of a motor.

The present invention proposes a control apparatus that can reduces or eliminates the torque ripple in reduction measures of motor torque ripples that occur due to the reason that each-phase characteristics (Lx, Rx) between a brushless DC motor and a control apparatus (an ECU) does not conform, at the same time converts each-phase characteristics into a desired characteristic (Lh, Rh), and in addition arbitrarily changes transient response of the motor (dynamic characteristics). By converting each-phase characteristics of the motor and the control apparatus into the desired characteristic (Lh, Rh) and conforming each-phase characteristics, it is possible to improve the ripple accuracy of the torque, the velocity and so on, there is no occurrence of the abnormal noises in the electric power steering apparatus, and also there is no the uncomfortable feeling with respect to the steering.

Hereinafter, embodiments of the present invention will be described in detail.

At first, motor characteristics will be described.

In the case that R represents resistances of the motor and the control apparatus, L represents inductances of the motor and the control apparatus, and a current i flows in the motor, a phase voltage Vm of the motor can be represented by the following Expression 1.

$$Vm = R \cdot I + L(di/dt) \quad \text{(Expression 1)}$$

Based on Expression 1, when setting s as a Laplace operator, and representing by a transfer function that sets its input as the phase voltage Vm and sets its output as the current I, the motor characteristics become the following Expression 2.

$$i = Vm \cdot (1/(L \cdot s + R)) \quad \text{(Expression 2)}$$

Therefore, characteristics of a-phase, b-phase and c-phase of the motor, that is, output currents ia~ic with respect to each-phase input voltages Vma~Vmc become the following Expression 3.

$$ia = Vma \cdot (1/(La \cdot s + Ra))$$

$$ib = Vmb \cdot (1/(Lb \cdot s + Rb))$$

$$ic = Vmc \cdot (1/(Lc \cdot s + Rc)) \quad \text{(Expression 3)}$$

With respect to each-phase characteristics (Lx, Rx) of the motor and the control apparatus that is represented by Expression 3, the present invention arranges a filter that compensates each-phase characteristics and at the same time becomes the desired characteristic (Lh, Rh) at each pathway between a PI control section 35 and a PWM control section 36. That is to say, each-phase filters Fa~Fc are arranged at pathways of voltage command values Varef~Vcref. Characteristics of each-phase filters Fa~Fc become the following Expression 4.

$$\text{a-phase filter: } Fa = (La \cdot s + Ra)/(Lh \cdot s + Rh)$$

$$\text{b-phase filter: } Fb = (Lb \cdot s + Rb)/(Lh \cdot s + Rh)$$

$$\text{c-phase filter: } Fc = (Lc \cdot s + Rc)/(Lh \cdot s + Rh) \quad \text{(Expression 4)}$$

By arranging filters Fa~Fc having characteristics represented by the above Expression 4 at each pathway between the PI control section 35 and the PWM control section 36, it is possible to compensate the variation of each phase represented by Expression 3, and at the same time it is possible to conform each-phase characteristics. Furthermore, by properly choosing the resistance Rh and the inductance Lh, it is possible to obtain arbitrary motor transient response characteristics (the dynamic characteristics).

Figure 4:
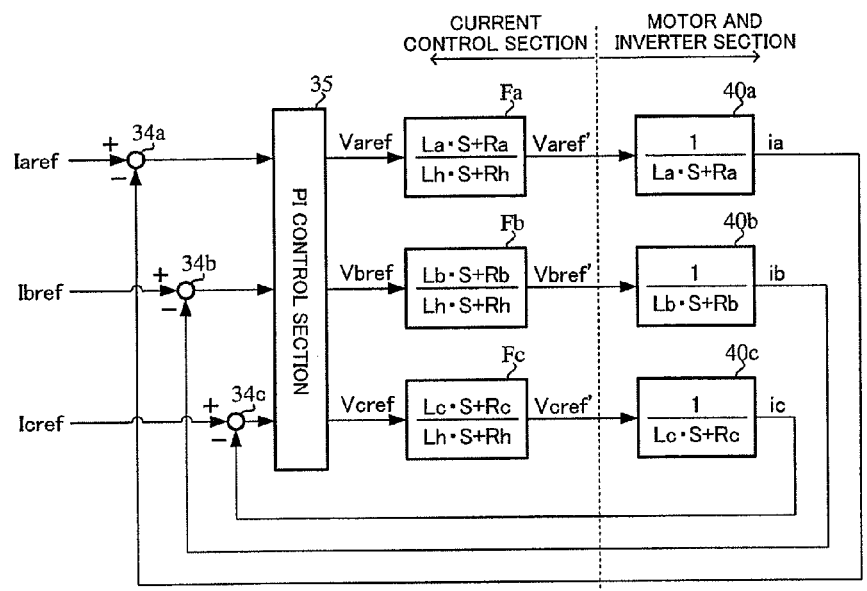
FIG. 4 is a block diagram for explaining the principles of the present invention.
Figure 5:
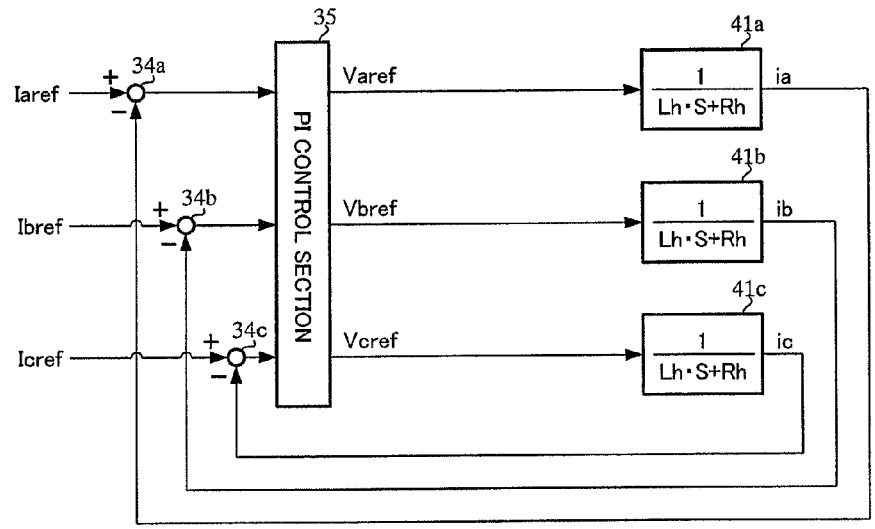
FIG. 5 is a block diagram for explaining the principles of the present invention.
Figure 6:
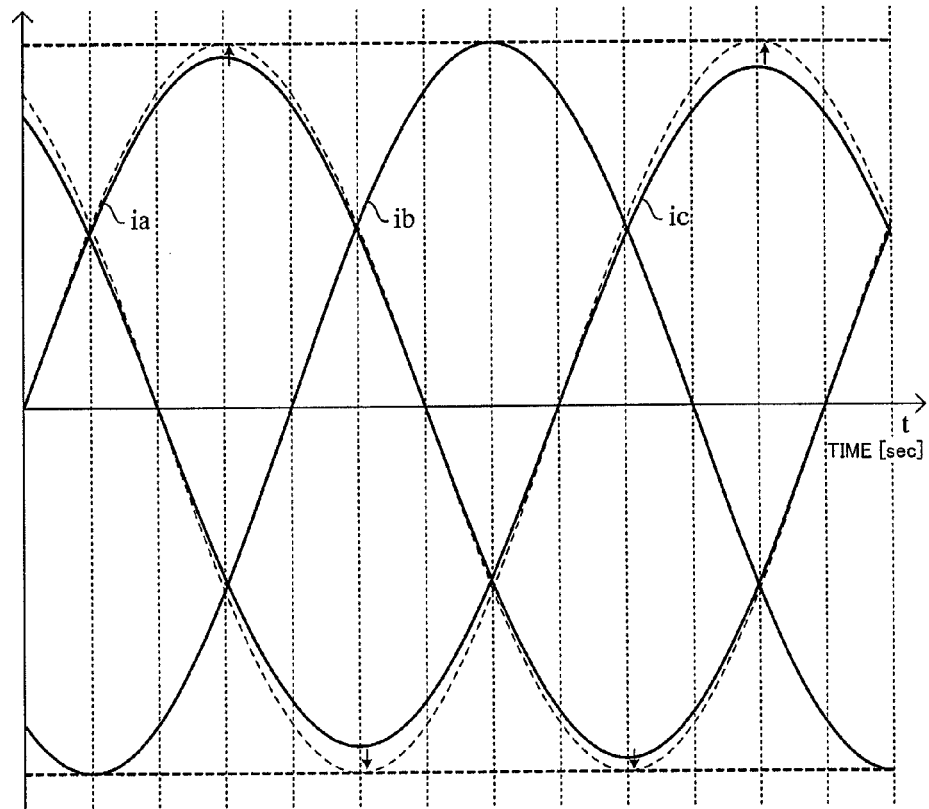
FIG. 6 is a waveform diagram of each-phase currents of the motor that shows effects of the present invention.

That is to say, as x=a, b, c, by arranging the filter Fx at each phase a, b and c, a configuration that makes each-phase characteristics (Lx, Rx) of the motor and the control apparatus identical and also makes each-phase characteristics (Lx, Rx) of the motor and the control apparatus becoming the desired each-phase characteristic (Lh, Rh) of the motor and the control apparatus, is possible. FIG. 4 is a block diagram that conceptually shows that configuration. As shown in FIG. 4, each-phase characteristics 40a~40c of the motor and the control apparatus, are compensated by filters Fa~Fc respectively, and on the whole as shown in FIG. 5, become simplified each-phase characteristic (Lh, Rh) of the motor and the control apparatus. In this way, each-phase characteristics become each-phase characteristics 41a~41c of the motor and the control apparatus, and therefore the variation of each phase disappears and moreover it is possible to make each-phase characteristics becoming the desired characteristic (Lh, Rh). As a result, as shown in FIG. 6, each-phase currents of the motor become waveform characteristics that peaks of amplitude values conform, and the ripple is improved or disappears.

Moreover, a-phase resistance Ra, b-phase resistance Rb, c-phase resistance Rc, a-phase inductance La, b-phase inductance Lb and c-phase inductance Lc are designed values or measured values.

Figure 7:
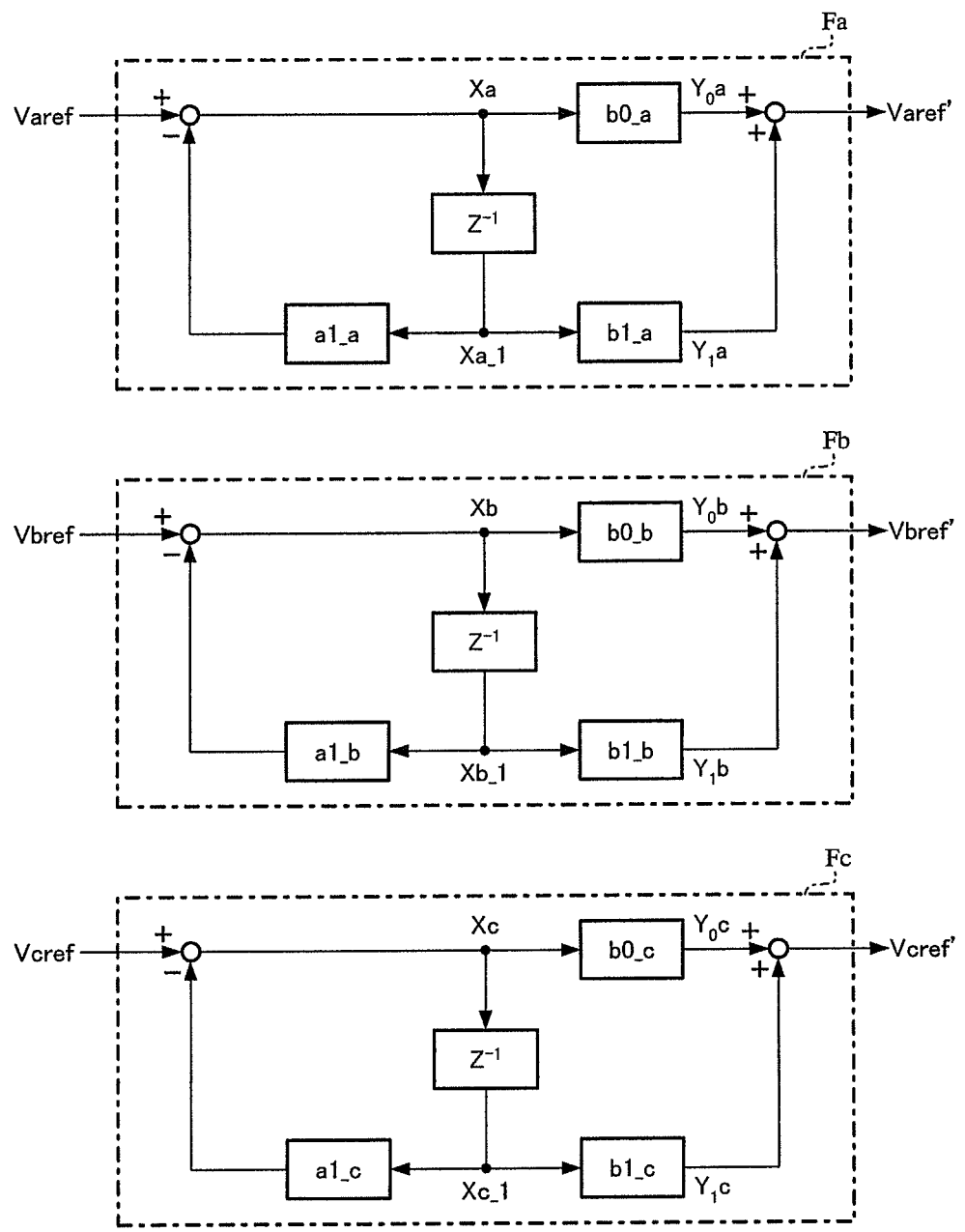
FIG. 7 is a block diagram showing examples of configuration method of filters used in the present invention.

Here, a configuration method of the filters Fa~Fc will be described with reference to FIG. 7. In the present invention, bilinear transformation is used, in the case of setting Ts as a sampling time (sec) and setting $Z^{-1}$ as a value before one sampling, the Laplace operator s is represented by the following Expression 5.

$$s = 2/Ts \cdot (1 - Z^{-1})/(1 + Z^{-1}) \quad \text{(Expression 5)}$$

By substituting Expression 5 into the above Expression 4, the following Expression 6 is obtained.

$$\text{a-phase filter: } Fa = (b0\_a + b1\_a \cdot Z^{-1})/(1 + a1\_a \cdot Z^{-1})$$

$$\text{b-phase filter: } Fb = (b0\_b + b1\_b \cdot Z^{-1})/(1 + a1\_b \cdot Z^{-1})$$

$$\text{c-phase filter: } Fc = (b0\_c + b1\_c \cdot Z^{-1})/(1 + a1\_c \cdot Z^{-1}) \quad \text{(Expression 6)}$$

Where the above coefficients a1_a, b0_a and b1_a of a-phase filter Fa are presented by the following Expression 7.

$$a1\_a = (Ts \cdot Rh - 2Lh)/(Ts \cdot Rh + 2Lh)$$

$$b0\_a = (Ts \cdot Ra + 2La)/(Ts \cdot Rh + 2Lh)$$

$$b1\_a = (Ts \cdot Ra - 2La)/(Ts \cdot Rh + 2Lh) \quad \text{(Expression 7)}$$

Furthermore, the above coefficients a1_b, b0_b and b1_b of b-phase filter Fb are presented by the following Expression 8.

$$a1\_b = (Ts \cdot Ra - 2Lh)/(Ts \cdot Rh + 2Lh)$$

$$b0\_b = (Ts \cdot Rb + 2Lb)/(Ts \cdot Rh + 2Lh)$$

$$b1\_b = (Ts \cdot Rb - 2Lb)/(Ts \cdot Rh + 2Lh) \quad \text{(Expression 8)}$$

Moreover, the above coefficients a1_c, b0_c and b1_c of c-phase filter Fc are presented by the following Expression 9.

$$a1\_c = (Ts \cdot Rh - 2Lh)/(Ts \cdot Rh + 2Lh)$$

$$b0\_c = (Ts \cdot Rc + 2Lc)/(Ts \cdot Rh + 2Lh)$$

$$b1\_c = (Ts \cdot Rc - 2Lc)/(Ts \cdot Rh + 2Lh) \quad \text{(Expression 9)}$$

Figure 8:
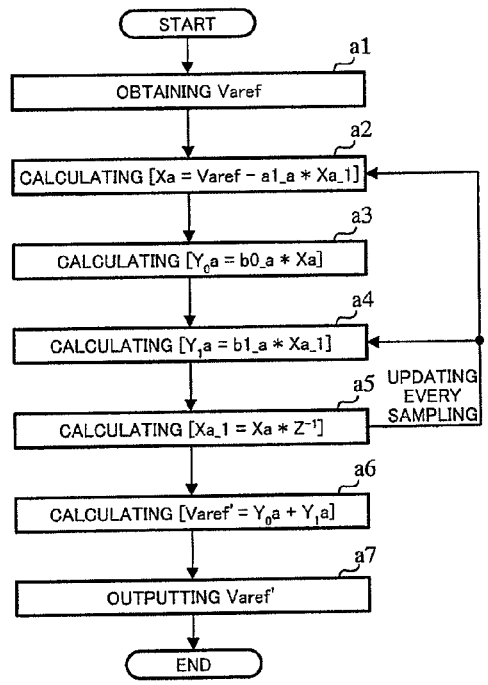
FIG. 8 is a flowchart showing an operation example of forming each-phase filters used in the present invention.
Figure 8:
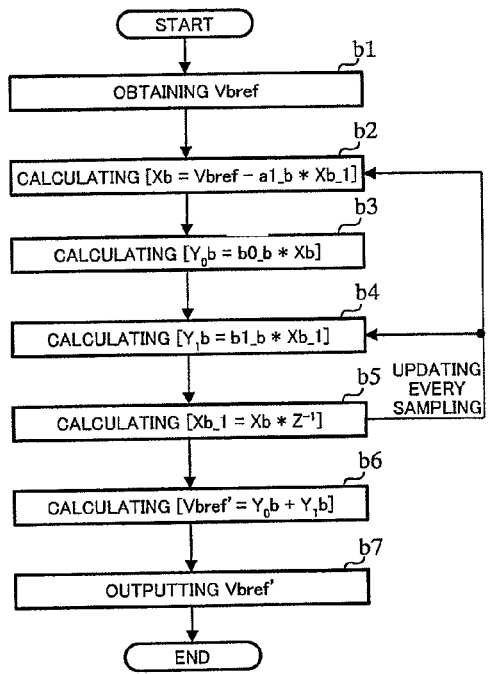
Figure 8:
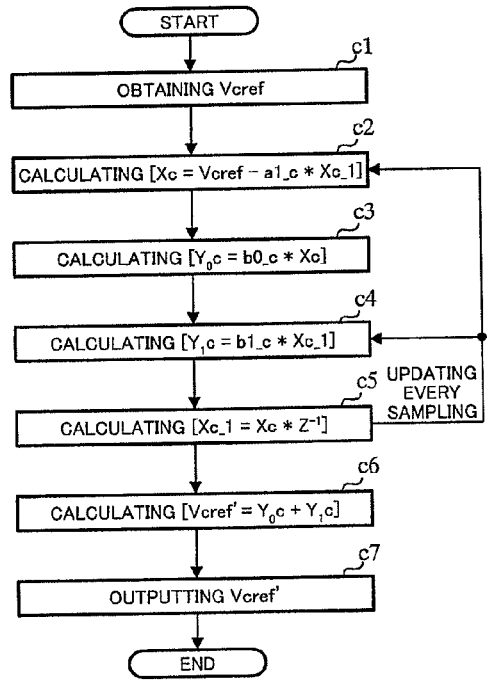

Here, an operation example of forming each-phase filters Fa~Fc will be described with reference to FIG. 8. Although FIG. 8(A) shows a method of forming a-phase filter Fa, FIG. 8(B) shows a method of forming b-phase filter Fb, and FIG. 8(c) shows a method of forming c-phase filter Fc, since only coefficients of each phase are different and operations of each phase are identical, hereinafter, the method of forming a-phase filter Fa will be described with reference to FIG. 8(A).

At first, inputting the voltage command value Varef (step Sa1), subtracting a product of multiplying a value before one sampling Xa_1 by the coefficient a1_a from the voltage command value Varef in a subtracting section (step Sa2). Further, the initial value of the value Xa_1 is zero, and a difference obtained by the subtraction operation performed in the subtracting section is Xa. And then, obtaining a product Y0a by multiplying the difference Xa by the coefficient b0_a (step Sa3), and at the same time, obtaining a product Y1a by multiplying the value before one sampling Xa_1 by the coefficient b1_a (step Sa4). Thereafter, multiplying the difference Xa by an unit $Z^{-1}$ (step Sa5), and at the same time, the values Xa, Y0a and Y1a are updated with respect to each sampling.

In an adding section, adding the values Y0a and Y1a that are obtained by the above-described way (step Sa6), and then outputting a sum obtained by the addition operation performed in the adding section as a new voltage command value Varef' (step Sa7). Similarly, with respect to b-phase filter Fb and c-phase filter Fc, new voltage command values Vbref' and Vcref' are outputted.

Figure 9:
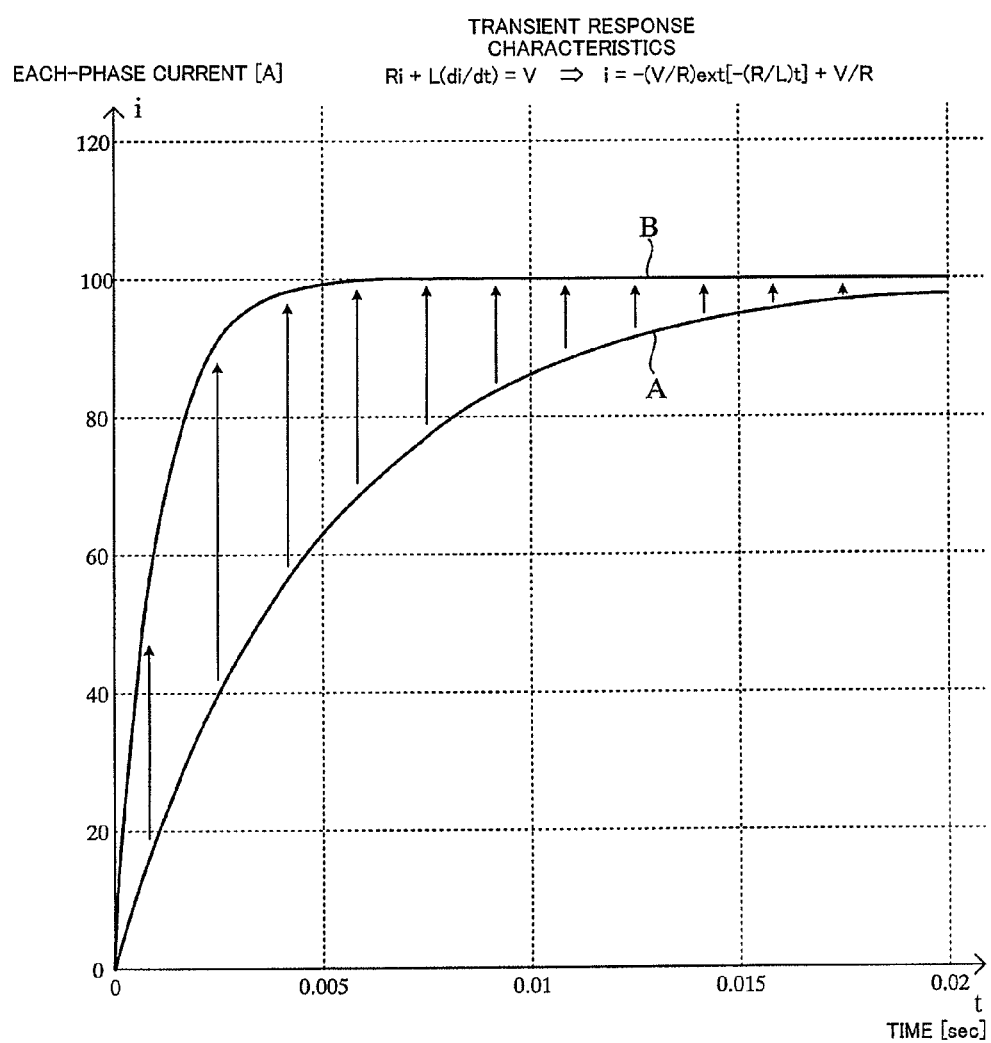
FIG. 9 is a diagram showing a characteristic example of transient response based on the present invention.

Furthermore, the following Expression 10 is derived from the above Expression 1, by properly changing the inductance L and the resistance R, with respect to step input of the voltage, as shown in FIG. 9, it is possible to improve the transient response (the dynamic characteristics). That is to say, by properly changing the inductance L and the resistance R, it is possible to obtain arbitrary transient response (arbitrary dynamic characteristics).

$$i=-(Vm/R)\text{ext}[-(R/L)t]+Vm/R \quad \text{(Expression 10)}$$

Next, one concrete embodiment of the present invention will be described with reference to FIG. 10. In this embodiment, each-phase currents ia~ic are fed back into the subtracting sections 34a~34c, and filters 42a~42c having characteristics Fa~Fc described by Expression 4 are arranged at subsequent part of the PI control section 35 that PI-controls deviations obtained by the subtracting sections 34a~34c, respectively. By arranging the filters 42a~42c at the subsequent part of the PI control section 35, each-phase characteristics shown in FIG. 4 and FIG. 5 conform. In this way, the ripple disappears and it is possible to prevent occurrence of the abnormal noises.

Figure 10:
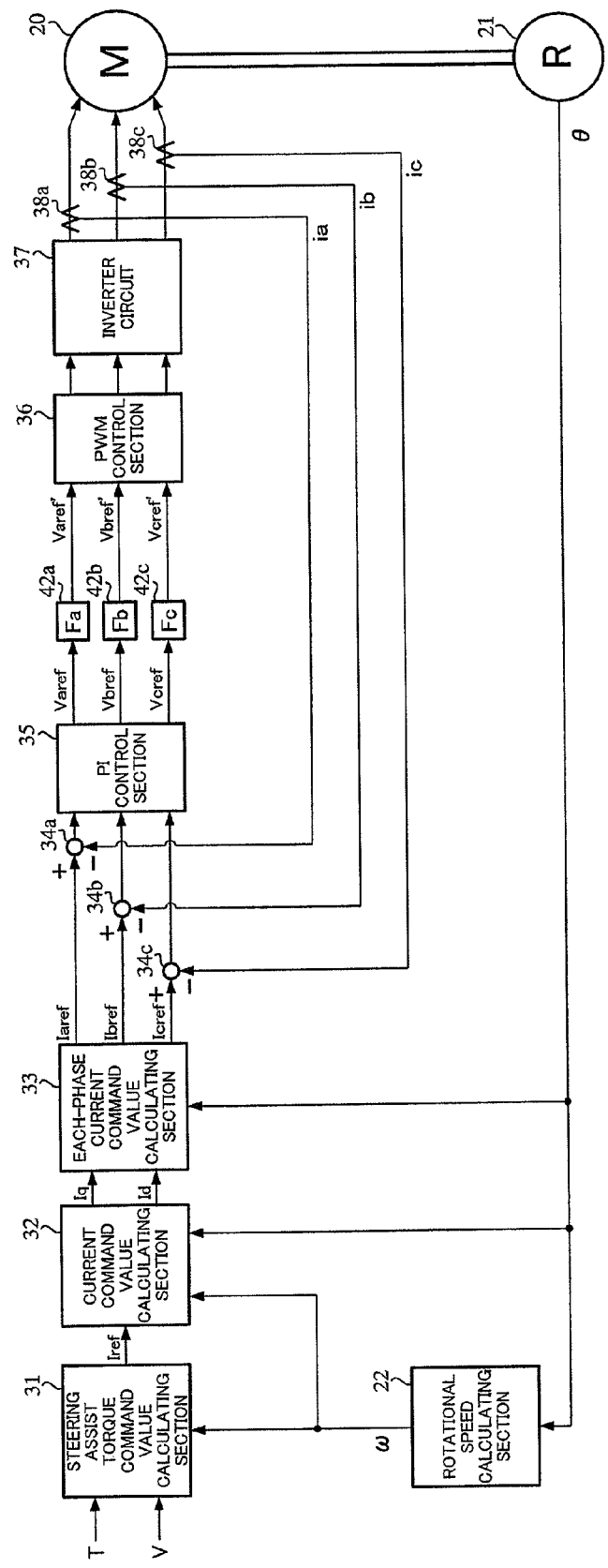
FIG. 10 is a block diagram showing one example of concrete embodiments of the present invention.
Figure 11:
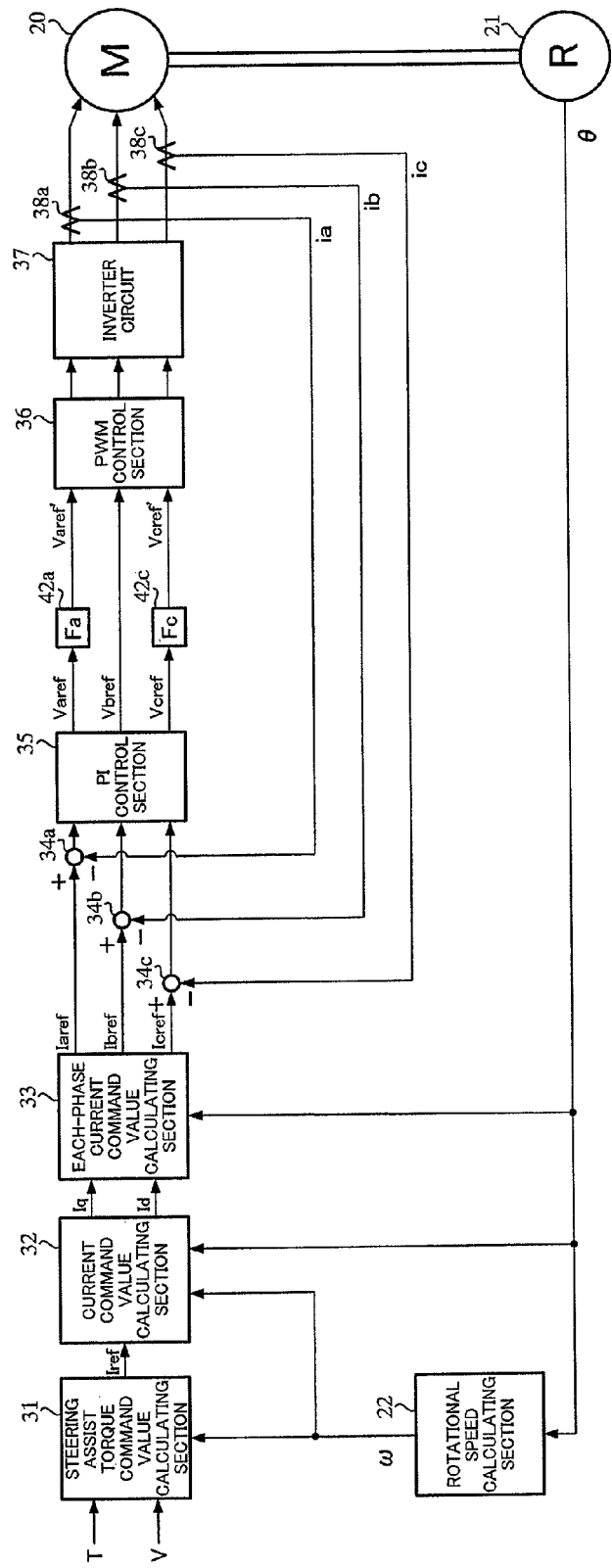
FIG. 11 is a block diagram showing another example of concrete embodiments of the present invention.

Although in the embodiment of FIG. 10, the filters 42a~42c are arranged at three phases respectively, since the denominator and the numerator of the b-phase filter 42b are reduced, for example, by making the desired characteristic (Lh, Rh) becoming the b-phase motor characteristic (Lh=Lb, Rh=Rb), it is possible to omit the b-phase filter 42b as shown in FIG. 11. In this way, it is possible to reduce calculation-task load. Although FIG. 11 shows an example of omitting the b-phase filter, the a-phase filter or the c-phase filter is similar, too.

Figure 12:
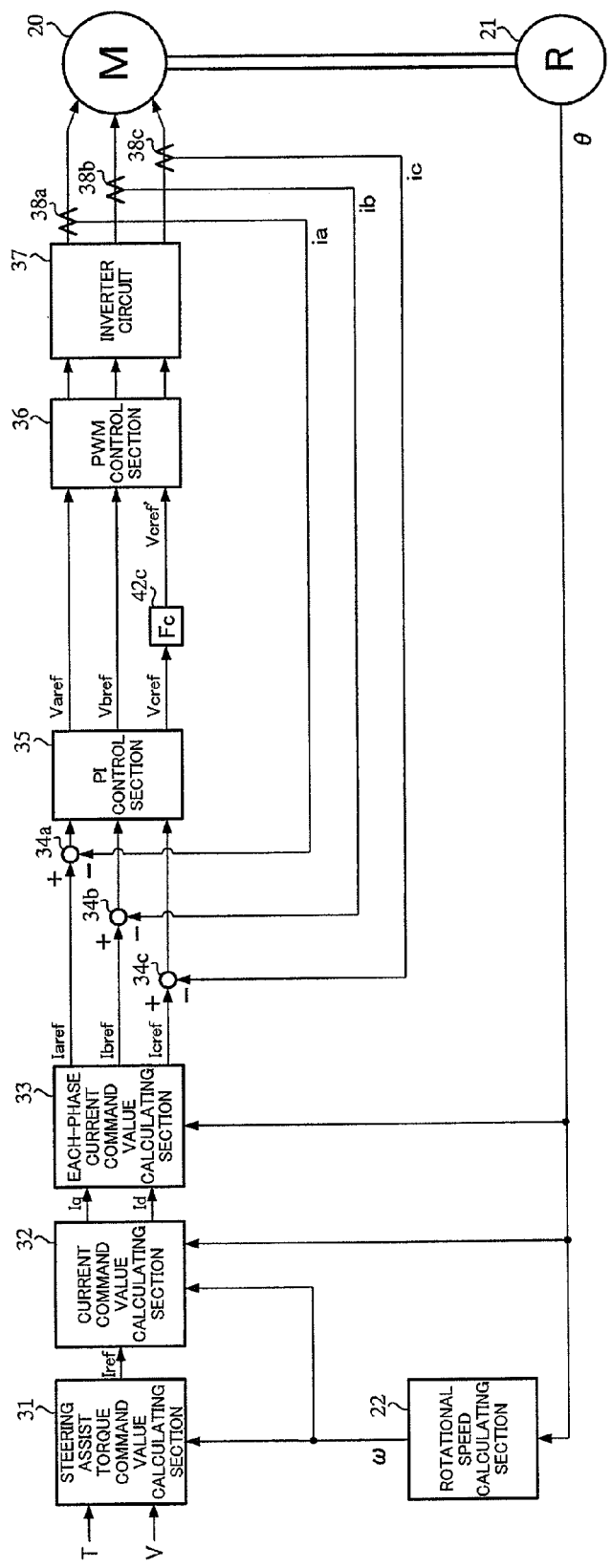
FIG. 12 is a block diagram showing another example of concrete embodiments of the present invention.

Furthermore, in the case that two phases of each-phase motor characteristics (Lx, Rx) are identical, as shown in FIG. 12, only the filter 42c is arranged at one remaining phase that the motor characteristic is different. FIG. 12 shows an example that the a-phase motor characteristic (La, Ra) and the b-phase motor characteristic (Lb, Rb) are identical (Lab=La=Lb, Rab=Ra=Rb), and the filter 42c is arranged at the c-phase.

Since all of examples of FIG. 10~FIG. 12 arrange the filter at the subsequent part of the PI control section 35, that is to say, since the voltage outputs from the last of the current control section are compensated, it is possible to rather easily perform than compensating current command values (current values). By properly changing filter characteristics, it is also possible to arrange the filter at previous part of the PI control section 35 and or the feedback pathway.

Furthermore, not only the above-described bilinear transformation but also frequency prewarp transformation can be used as the method for converting the Laplace operator s.

Moreover, although the above-described description is performed with respect to the electric power steering apparatus with the vector control system, the present invention is not limited to the vector control system. In addition, although the example of a three-phase motor is described, the present invention is also not limited to a three-phase brushless DC motor.

EXPLANATION OF REFERENCE NUMERALS 1 steering wheel
5 rack and pinion mechanism
10 torque sensor
14 battery
20 motor
21 rotation sensor
22 rotational speed calculating section
30 control unit (ECU)
31 steering assist torque command value calculating section
32 current command value calculating section
33 each-phase current command value calculating section
34a, 34b, 34c subtracting section
35 PI control section
36 PWM control section
37 inverter
40a~40c, 41a~41c each-phase characteristics of motor and control apparatus
Fa~Fc, 42a~42c filter

The invention claimed is:

1. A control method of a control apparatus for an electric power steering apparatus that calculates a steering assist torque command value based on a steering torque generated in a steering shaft and a velocity by a steering assist torque command value calculator, calculates each-phase current command values from said steering assist torque command value by a current command value calculating section, and controls a motor that provides a steering mechanism with a steering assist torque based on current control values calculated from said each-phase current command values and each-phase current values of said motor by a controller, the method comprising:

selectively arranging filters, which have a characteristic that offsets said motor and each-phase inductance and resistance characteristics of said control apparatus, on at least one phase pathway of a plurality of phase pathways between a PI control section and a PWM control section at an output of the PI control section, based on said motor and each-phase inductance and resistance characteristics of said control apparatus;

conforming said motor and said each-phase inductance and resistance characteristics of said control apparatus, and obtaining a desired dynamic characteristic by converting said each-phase inductance and resistance characteristics with said filters; and reducing operating noises and vibrations due to the difference in the peak value of the phase current.

2. The control method according to claim 1, wherein by conforming said desired dynamic characteristic to any one of said each-phase inductance and resistance characteristics, only arranging filters on remaining phase pathways of the plurality of phase pathways.

3. The control method according to claim 2, wherein
control of said motor is a vector control method, and
said steering assist torque command value and said each-phase current command values are calculated based on a rotational angle a said rotation sensor connected to said motor and a rotational speed calculated from said rotational angle.

4. The control method according to claim 1, wherein
if any two of said each-phase inductance and resistance characteristics conform, only arranging a filter on a remaining phase pathway of the plurality of phase pathways.

5. The control method according to claim 4, wherein
control of said motor is a vector control method, and
said steering assist torque command value and said each-phase current command values are calculated based on a rotational angle from a rotation sensor connected to said motor and a rotational speed calculated from said rotational angle.

6. The control method according to claim 1, wherein
control of said motor is a vector control method, and
said steering assist torque command value and said each-phase current command values are calculated based on a rotational angle from a rotation sensor connected to said motor and a rotational speed calculated from said rotational angle.

7. A control apparatus for an electric power steering apparatus, the control apparatus comprising:
a steering assist torque command value calculator that calculates a steering assist torque command value based on a steering torque generated in a steering shaft and a velocity;
a current command value calculating section that calculates each-phase current command values from said steering assist torque command value;
a controller that controls a motor that provides a steering mechanism with a steering assist torque based on current control values calculated from said each-phase current command values and each-phase current values of said motor; and
filters, which have a characteristic that offsets said motor and each-phase inductance and resistance characteristics of said control apparatus, selectively arranged on at least one phase pathway of a plurality phase pathways between a PI control section and a PWM control section at an output of the PI control section, based on based on said motor and each-phase inductance and resistance characteristics of said control apparatus,
wherein the control apparatus conforms said motor and said each-phase inductance and resistance characteristics of said control apparatus, and obtains a desired dynamic characteristic by converting said each-phase inductance and resistance characteristics with said filters; and
reducing operating noises and vibrations due to the difference in the peak value of the phase current.

8. The control apparatus according to claim 7, wherein
if the control apparatus conforms said desired dynamic characteristic to any one of said each-phase inductance and resistance characteristics, filters are arranged only on remaining phase pathways of the plurality of phase pathways.

9. The control apparatus according to claim 8, wherein
the controller controls said motor using a vector control method, and
said steering assist torque command value and said each-phase current command values are calculated based on a rotational angle from a rotation sensor connected to said motor and a rotational speed calculated from said rotational angle.

10. The control apparatus according to claim 9, wherein
said motor is a three-phase brushless DC motor.

11. The control apparatus according to claim 7, wherein
if any two of said each-phase inductance and resistance characteristics conform, a filter is arranged only at a remaining phase pathway of the plurality of phase pathways.

12. The control apparatus according to claim 11, wherein
the controller controls said motor using a vector control method,
said steering assist torque command value and said each-phase current command values are calculated based on a rotational angle from a rotation sensor connected to said motor and a rotational speed calculated from said rotational angle.

13. The control apparatus according to claim 12, wherein
said motor is a three-phase brushless DC motor.

14. The control apparatus according to claim 7, wherein
the controller controls said motor using a vector control method, and
said steering assist torque command value and said each-phase current command values are calculated based on a rotational angle from a rotation sensor connected to said motor and a rotational speed calculated from said rotational angle.

15. The control apparatus according to claim 14, wherein
said motor is a three-phase brushless DC motor.

\* \* \* \* \*